United States Patent [19]

Dehnert et al.

[11] 4,128,545

[45] * Dec. 5, 1978

[54] AZO DYES WITH 2,6-DIAMINO-PYRIDINE COUPLING COMPONENT

[75] Inventors: Johannes Dehnert; Gunther Lamm, both of Ludwigshafen, Fed. Rep. of Germany

[73] Assignee: BASF Aktiengesellschaft, Rheinland-Pfalz, Fed. Rep. of Germany

[*] Notice: The portion of the term of this patent subsequent to Dec. 21, 1993, has been disclaimed.

[21] Appl. No.: 426,370

[22] Filed: Dec. 19, 1973

[30] Foreign Application Priority Data

Dec. 27, 1972 [DE] Fed. Rep. of Germany ....... 2263458

[51] Int. Cl.$^2$ .................. C09B 29/36; D06P 1/18; D06P 3/26; D06P 3/72
[52] U.S. Cl. .................................. 260/156; 546/289; 546/285
[58] Field of Search ......................................... 260/156
[56] References Cited

U.S. PATENT DOCUMENTS

| | | | |
|---|---|---|---|
| 1,680,109 | 8/1928 | Ostromislensky | 260/156 |
| 1,862,361 | 6/1932 | Dohrn et al. | 260/156 |
| 1,990,923 | 2/1935 | Tisza et al. | 260/156 |
| 2,029,315 | 2/1936 | Engelmann | 260/156 |
| 2,068,353 | 1/1937 | Schneiderwirth | 260/156 |
| 2,135,293 | 11/1938 | Renshaw et al. | 260/156 |
| 2,148,705 | 2/1939 | Mietzsch et al. | 260/156 |
| 3,357,968 | 12/1967 | Wilbert et al. | 260/156 |

FOREIGN PATENT DOCUMENTS 270987 12/1950 Switzerland ............................. 260/156

OTHER PUBLICATIONS

Shreve et al., J. Am. Chem. Soc., vol. 65, pp. 2241–2243 (1943).

*Primary Examiner*—Floyd D. Higel
*Attorney, Agent, or Firm*—Keil, Thompson & Shurtleff

[57] ABSTRACT

Azo dyes having a 2,6-diamino-pyridine as coupling component, one of the amino groups bearing a bicyclic or polycyclic non-aromatic radical as a substituent. The dyes are eminently suitable as disperse dyes, particularly for synthetic linear polyesters, and give bright dyeings having excellent fastness properties.

10 Claims, No Drawings

AZO DYES WITH 2,6-DIAMINO-PYRIDINE COUPLING COMPONENT

The dyes are identified by the formula

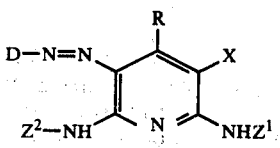

in which

D is the radical of a diazo component;
R is hydrogen, unsubstituted or substituted alkyl of one to seven carbon atoms or unsubstituted or substituted phenyl;
X is hydrogen, carbamoyl or cyano;
one of the radicals $Z^1$ and $Z^2$ is an unsubstituted or substituted bicyclic or polycyclic non-aromatic radical and the other is hydrogen or unsubstituted or substituted alkyl, cycloalkyl, aralkyl or phenyl.

The diazo component D is one of the naphthalene, diphenyl, benzothiazole, benzoisothiazole, thiazole, thiadiazole, thiophene, triazole, benzotriazole, indazole, pyrazole, azobenzene or anthraquinone series.

The following are examples of substituents for the radical D of the diazo component:

In the benzene series:
chloro, bromo, nitro, cyano, trifluoromethyl, methylsulfonyl, ethylsulfonyl, phenylsulfonyl, p-(β-hydroxyethyl)-phenylsulfonyl, carbomethoxy, carboethoxy, carbobutoxy, carbo-β-methoxyethoxy, carbo-β-ethylhexoxy, carbo-β-hydroxyethoxy, optionally N-monosubstituted or N-disubstituted carbamoyl or sulfamoyl, methyl, ethyl, methoxy or ethoxy.

N-substituents of the carbamoyl or sulfamoyl radicals are for example methyl, ethyl, propyl, butyl, β-ethylhexyl, cyclohexyl, benzyl, phenylethyl, β-hydroxymethyl, β-hydroxypropyl, β-methoxyethyl, γ-methoxyethyl, γ-methoxypropyl and γ-ethoxypropyl and also pyrrolidide, piperidide and morpholide.

In the azobenzene series:
chloro, bromo, nitro, cyano, carbomethoxy, carboethoxy, methyl, ethyl, methoxy, ethoxy, hydroxy, acetylamino, formyl, β-hydroxyethoxy and ethoxycarbonylamino.

In the heterocyclic series:
chloro, bromo, nitro, cyano, methyl, ethyl, phenyl, methoxy, ethoxy, methylmercapto, β-carbomethoxyethylmercapto, β-carboethoxyethylmercapto, carbomethoxy, carboethoxy, acetyl, methylsulfony and ethylsulfonyl.

The radical D may be derived for example from the following amines:

o-toluidine, m-toluidine-p-toluidine, o-nitroaniline, m-nitroaniline, p-nitroaniline, o-cyanoaniline, m-cyanoaniline, p-cyanoaniline, 2,4-dicyanoaniline, o-chloroaniline, m-chloroaniline, p-chloroaniline, 3,4-dichloroaniline, 2,5-dichloroaniline, 2,4,5-trichloroaniline, 2,4,6-trichloroaniline, o-bromoaniline, m-bromoaniline, p-bromoaniline, 2,4,6-tribromoaniline, 2-chloro-4-nitroaniline, 2-bromo-4-nitroaniline, 2-cyano-4-nitroaniline, 2-methylsulfonyl-4-nitroaniline, 2-methyl-4-nitroaniline, 2-methoxy-4-nitroaniline, 4-chloro-2-nitroaniline, 4-methyl-2-nitroaniline, 4-methoxy-2-nitroaniline, 1-amino-2-trifluoromethyl-4-chlorobenzene, 2-chloro-5-aminobenzonitrile, 2-amino-5-chlorobenzonitrile, 1-amino-2-nitrobenzene-4-sulfonic n-butylamide, 1-amino-2-nitrobenzene-4-sulfonic β-methoxyethylamide, 2,4-dinitroaniline, 2,4-dinitro-6-chloroaniline, 2,4-dinitro-6-bromoaniline, 2,4-dinitro-6-cyanoaniline, 1-amino-2,4-dinitrobenzene-6-methylsulfone, 2,6-dichloro-4-nitroaniline, 2,6-dibromo-4-nitroaniline, 2-chloro-6-bromo-4-nitroaniline, 2,6-dicyano-4-nitroaniline, 2-cyano-4-nitro-6-chloroaniline, 2-cyano-4-nitro-6-bromoaniline, 1-aminobenzene-4-methylsulfone, 1-amino-2,6-dibromobenzene-4-methylsulfone, 1-amino-2,6-dichlorobenzene-4-methylsulfone, 1-amino-2,6-dinitrobenzene-6-carboxylic methyl or β-methoxyethyl ester, propyl 3,5-dichloroanthranilate, β-methoxyethyl 3,5-dibromoanthranilate, N-benzoyl-p-phenylenediamine, N-acetyl-p-phenylenediamine, N-phenylsulfonyl-p-phenylenediamine, N-phenylsulfonyl-m-phenylenediamine, 4-aminoacetophenone, 4-aminobenzophenone, 2-aminobenzophenone, 2-aminodiphenylsulfone, the methyl, ethyl, propyl, butyl, isobutyl, β-ethylhexyl, cyclohexyl, benzyl, phenyl, β-methoxyethyl, β-ethoxyethyl, β-butoxyethyl, methyl diglycol, ethyl diglycol, methyl triglycol, ethyl triglycol, β-hydroxyethyl, β-acetoxyethyl, β-(β'-hydroxyethoxy)-ethyl, β-hydroxypropyl, γ-hydroxypropyl, ω-hydroxybutyl or ω-hydroxyhexyl ester of 2-aminobenzoic acid, 3-aminobenzoic acid or 4-aminobenzoic acid, the methyl, isobutyl, methyl diglycol, β-methoxyethyl, β-butoxyethyl or β-acetoxyethyl ester of 5-nitroanthranilic acid, the dimethyl, diethyl, dipropyl or dibutyl ester of 3-aminophthalic acid, 4-aminophthalic acid, 5-aminoisophthalic acid or aminoterephthalic acid, the amide, methylamide, propylamide, butylamide, isobutylamide, cyclohexylamide, β-ethylhexylamide, γ-methoxypropylamide, γ-ethoxypropylamide or anilide of 3-aminobenzoic acid or 4-aminobenzoic acid, the dimethylamide, diethylamide, pyrrolidide or morpholide of 2-aminobenzoic acid, 3-aminobenzoic acid or 4-aminobenzoic acid, N-methyl-N-β-hydroxyethylamide, the diamide or bis-γ-methoxypropylamide of 5-aminoisophthalic acid, the bis-diethylamide of aminoterephthalic acid, the imide, β-hydroxyethylimide, γ-hydroxypropylimide, phenylimide or p-tolylimide of 3-aminophthalic acid or 4-aminophthalic acid, the β-hydroxyethylimide of 3-amino-6-nitrophthalic acid, the dimethylamide, diethylamide, pyrrolidide, morpholide or N-methylanilide of 2-aminobenzosulfonic acid, 3-aminobenzosulfonic acid or 4-aminobenzosulfonic acid, the 2'-aminophenyl, 3'-aminophenyl or 4'-aminophenyl ester of methylsulfonic acid, the 2'-aminophenyl, 3'-aminophenyl or 4'-aminophenyl ester of ethylsulfonic acid, the 2'-aminophenyl, 3'-aminophenyl or 4'-aminophenyl ester of butylsulfonic acid, the 2'-aminophenyl, 3'-aminophenyl or 4'-aminophenyl ester of benzenesulfonic acid, the ethylimide, butylimide, β-methoxyethylimide or γ-methoxypropylimide of 4-aminonaphthalic acid, 1-aminonaphthalene, 2-aminonaphthalene, 1-amino-2-ethoxynaphthalene, 2-aminodiphenyl, 4-aminodiphenyl, 1-aminoanthraquinone, 1-amino-4-chloroanthraquinone, 3-aminodiphenylene oxide, 4-aminodiphenylene oxide, 2-aminobenzothiazole, 2-amino-6-methylsulfonylbenzothiazole, 2-amino-6-nitrobenzothiazole, 5,6-dichloro-2-aminobenzothiazole, 6,7-dichloro-2-aminobenzothiazole, 4-amino-5-bromo-7-nitro-1,2-benzoisothiazole, 3-amino-5-nitro-2,1-benzoisothiazole, 3-amino-5-nitro-7-bromo-2,1-benzoisothiazole, 2-aminothiazole, 2-amino-5-nitrothiazole, the ethyl ester of 2-amino-4-methylthiazole-5-carboxylic acid, 2-amino-4- methyl-5-acetylthiazole, 2-amino-3-cyano-4-methylthiophene-5-carboxylic esters, 2-phenyl-5-amino-1,3,4-thiadiazole, 3-methylmercapto-5-amino-1,2,4-thiadiazole, 3-β-carbomethoxyethylmercapto-5-amino-1,2,4-thiadiazole, 3-amino-1,2,4-triazole, 4-amino-7-nitrobenzotriazole, 3-aminoindazole, 3-amino-5-chloroindazole, 3-amino-5-nitroindazole, 1-benzyl-5-aminopyrazole and 1-phenyl-5-aminopyrazole.

Examples of suitable diazo components of the aminoazo series are: 4-aminoazobenzene, 2',3-dimethyl-4-aminoazobenzene, 3',2-dimethyl-4-aminoazobenzene, 2,5-dimethyl-4-aminoazobenzene, 2-methyl-5-methoxy-4-aminoazobenzene, 2-methyl-4',5-dimethoxy-4-aminoazobenzene, 4'-chloro-2-methyl-5-methoxy-4-aminoazobenzene, 4'-nitro-2-methyl-5-methoxy-4-aminoazobenzene, 4'-hydroxyl-2-methyl-5-methoxy-4-aminoazobenzene, 4'-(β-hydroxyethoxy)-2-methyl-5-methoxy-4-aminoazobenzene, 4'-hydroxy-2,2'-dimethyl-5-methoxy-4-aminoazobenzene, 4'-hydroxy-4-aminoazobenzene, 4'-hydroxy-2'-methyl-4-aminoazobenzene, 4'-hydroxy-3'-methyl-4-aminoazobenzene, 2'-5'-methyl-4-aminoazobenzene, 4'-hydroxy-2-methoxy-4-aminoazobenzene, 4'-hydroxy-2'-chloro-4-aminoazobenzene, 4'-hydroxy-2,5-dimethoxy-aminoazobenzene, 4'-hydroxy-2,6-dichloro-4-aminoazobenzene, 4-hydroxy-3-methoxy-4-aminoazobenzene, 4'-chloro-2-methyl-4-aminoazobenzene, 4'-formyl-2-methyl-4-aminoazobenzene, 4'-(ethoxycarbonylamino)-2-methyl-4-aminoazobenzene, 2,5-dimethoxy-4-aminoazobenzene, 4'-chloro-2,5-dimethoxy-4-aminoazobenzene, 4'-nitro-2,5-dimethoxy-4-aminoazobenzene, 4'-(hydroxyethoxy)-2,5-dimethoxy-4-aminoazobenzene, 4'-chloro-2,5-dimethyl-4-aminoazobenzene, 4'-methoxy-2,5-dimethyl-4-aminoazobenzene, 4'-nitro-4-aminoazobenzene, 3,5-dibromo-4-aminoazobenzene, 2,3'-dichloro-4-aminoazobenzene, 3-methoxy-4-aminoazobenzene, 1-phenylazo-4-aminonaphthalene and 2-phenylazo-3-ethoxy-4-aminonaphthalene.

Examples of radicals R (in addition to hydrogen) are: ethyl, n-propyl, isopropyl, butyl, pentyl, α-ethylpentyl, phenyl or methylphenyl and preferably methyl.

The unsubstituted or substituted bicyclic or polycyclic amino radicals $Z^1NH$ or $Z^2NH$ in particular have from 7 to 15 ring members and may bear halogen, haloalkyl, hydroxy, hydroxyalkyl or alkoxyalkyl as substituents. Specific examples of $Z^1$ and $Z^2$ are:

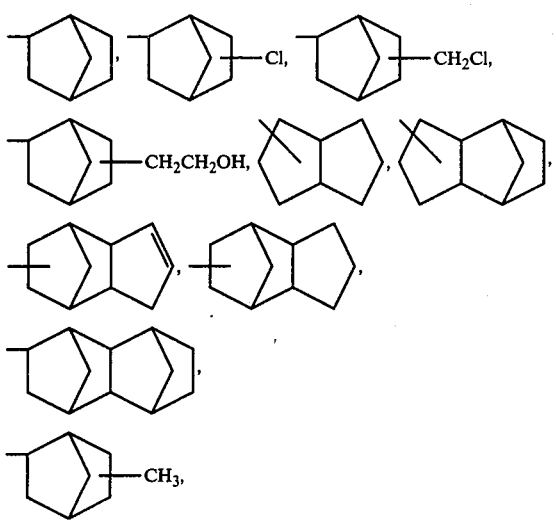

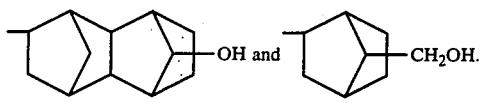

In addition to hydrogen and the radicals of the said formulae, $Z^1$ and $Z^2$ may also be for example alkyl of one to eight carbon atoms, hydroxyalkyl of two to eight carbon atoms, alkoxyalkyl of a total of three to eleven carbon atoms, phenoxyalkyl, aralkoxyalkyl, cycloalkyl, acyloxyalkyl of three to seventeen carbon atoms, carbalkoxyalkyl of 3 to 15 carbon atoms, carboxyalkyl of two to twelve carbon atoms, pyrrolidonylalkyl, cycloalkyl of five to eight ring members, aralkyl of seven to fifteen carbon atoms, phenyl, phenyl bearing chloro, bromo, alkyl, hydroxyl, hydroxyalkyl, alkoxy, cyano or alkanoylamino as a substituent, hydroxyalkoxyalkyl, hydroxypolyalkoxyalkyl and polyalkoxyalkyl.

Specific examples are as follows: the alkyl radicals: methyl, ethyl, propyl, butyl, hexyl, β-ethylhexyl and allyl; the hydroxyalkyl radicals: β-hydroxyethyl, β-hydroxypropyl, γ-hydroxypropyl, ω-hydroxybutyl and ω-hydroxyhexyl and the radical of the formula:

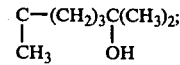

the alkoxyalkyl radicals: β-methoxyethyl, γ-methoxypropyl, β-ethoxyethyl, γ-ethoxypropyl, γ-isopropoxypropyl, γ-butoxypropyl, γ-isobutoxypropyl and the radical of the formula:

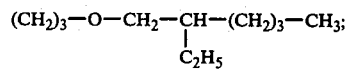

the phenoxyalkyl, aralkoxyalkyl and cycloalkoxyalkyl radicals of the formulae:

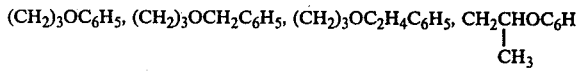

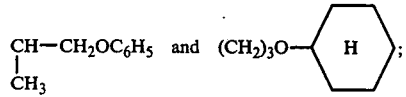

the hydroxypolyalkoxy and polyalkoxyalkyl radicals of the formulae:

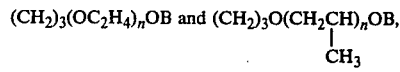

in which n is 1, 2 or 3 and B is hydrogen, alkyl of one to four carbon atoms, benzyl, phenylethyl or phenyl;

the carboxyalkyl and carbalkoxyalkyl radicals of the formulae: $CH_2$—COOY, $CH_2$—$CH_2$—COOY, $(CH_2)_5$—COOY and $(CH_2)_2$—O—CO—$(CH_2)_2$—COOY, in which Y is for example hydrogen, methyl, ethyl, propyl, benzyl, β-hydroxyethyl, ω-hydroxyhexyl, δ-hydroxybutyl, β-methoxyethyl, γ-methoxypropyl, γ-ethoxypropyl, β-phenoxyethyl or β-hydroxyethoxyethyl; the acyloxyalkyl radicals of the formulae:

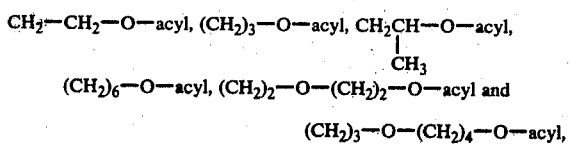

in which acyl is for example:

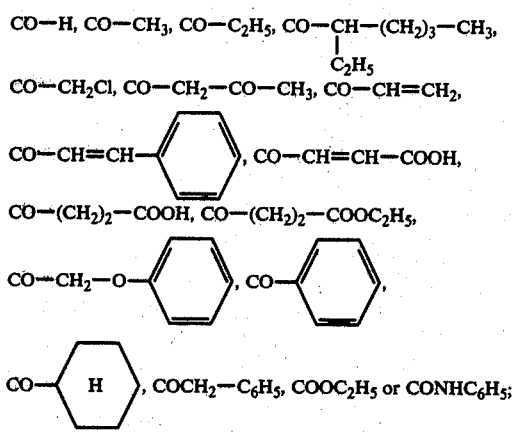

The pyrrolidonylalkyl radicals of the formulae:

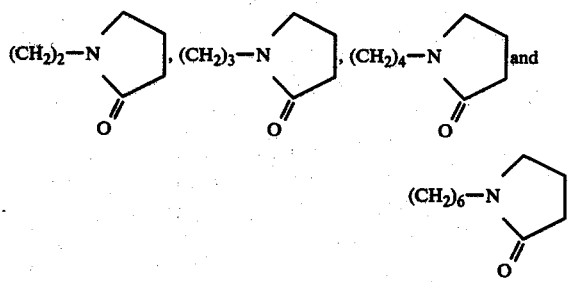

the cycloalkyl radicals of the formulae:

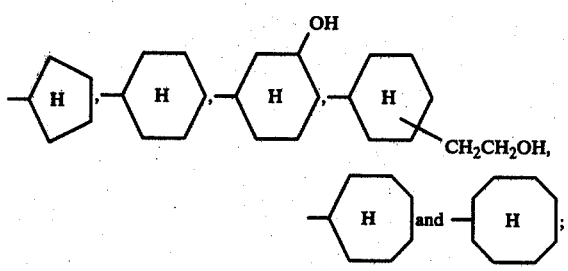

the aralkyl radicals of the formulae:

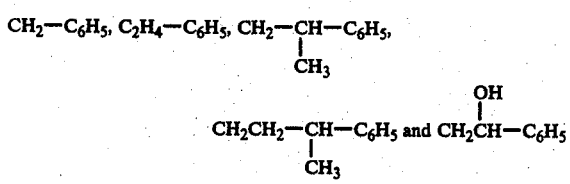

and with $C_6H_4—CH_3$ instead of $C_6H_5$ and the radicals of the formulae: $C_6H_5$, $C_6H_4Cl$, $C_6H_3Cl_2$, $C_6H_4CH_3$, $C_6H_3(CH_3)_2$, $C_6H_4OCH_3$, $C_6H_4CN$ and $C_6H_4NHCOCH_3$.

Dyes of the formula (I) may be prepared by reacting the diazo compound of an amine of the formula (II):

with a coupling component of the formula (III):

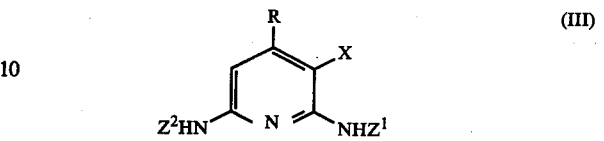

in which

D, R, X, $Z^1$ and $Z^2$ have the above meanings.

The diazotization of the amines is carried out by a conventional method. The coupling is also carried out by a conventional method in aqueous medium, with or without the addition of a solvent, with a weakly to strongly acid reaction.

If dyes according to the invention of the formula (I) contain an ester grouping in the radical $Z^1$ and/or $Z^2$ the production of the compounds of formula (I) can in principle be carried out by the said process if the appropriate ester grouping is already contained in the coupling component. In some cases it is convenient however to introduce the acid radical (acyl) into the finished dye of formula (I). The free acids, their anhydrides, chlorides or esters are suitable for this purpose and inert diluents or solvents such as monochlorobenzene, dichlorobenzene, trichlorobenzene, dioxane, dimethylformamide, N-methylpyrrolidone or pyridine may conveniently be added.

It may be advantageous in an esterification with a free acid to add an inorganic or organic catalyst, for example hydrogen chloride gas or p-toluenesulfonic acid and to allow the water formed to escape from the reaction mixture by evaporation. When an acid anhydride or acid chloride is used for the esterification the acid in question may in special cases be used as a solvent. Thus reaction with acetic anhydride may be carried out in glacial acetic acid. When an acid chloride is used as esterifying agent it is of advantage to add to the reaction mixture an acid-binding agent, for example sodium carbonate or sodium acetate, magnesium oxide or pyridine. Examples of specific esterifying agents are: formic acid, acetic acid, chloroacetic acid and the esters, anhydrides or chlorides of these acids; also ethyl chloroformate or diketene.

Dyes and mixtures of dyes of the formula (Ia):

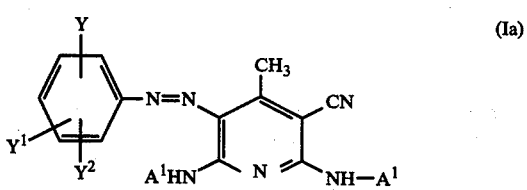

in which

Y is nitro, cyano, chloro, bromo, carbomethoxy, carboethoxy, β-methoxycarboethoxy, methylsulfonyl, ethylsulfonyl, methyl, methoxy or phenylazo;

$Y^1$ is hydrogen, nitro, chloro, bromo, cyano, methyl, methoxy, carbomethoxy, carboethoxy, methylsulfonyl or ethylsulfonyl; and $Y^2$ is hydrogen, chloro, bromo, cyano, methyl, methoxy, carbomethoxy or carboethoxy;

one A¹ is a radical of the formula:

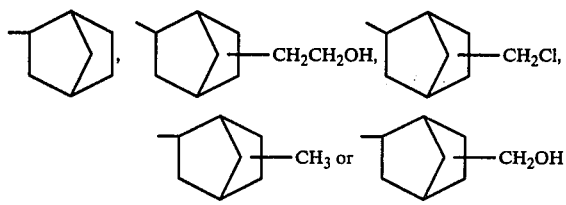

and the other A¹ is hydrogen or a radical containing a hydroxyl or alkoxy group and the hydroxy group may be esterified by formyl or acetyl are particularly valuable industrially.

Examples of preferred radicals A¹ are: hydrogen, ω-hydroxybutyl, ω-hydroxyhexyl, β-hydroxyethyl, β-hydroxypropyl or radicals of the formulae:

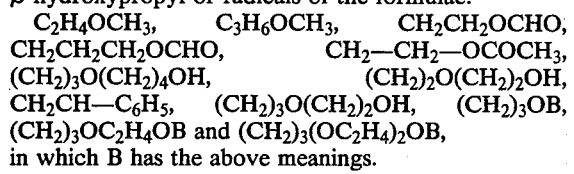
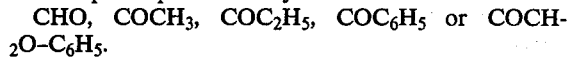

in which B has the above meanings.

Example of preferred acyl radicals are:

CHO, COCH₃, COC₂H₅, COC₆H₅ or COCH₂O-C₆H₅.

The corresponding dyes which contain as the diazo component a benzothiazole, benzoisothiazole, thiazole, thiadiazole or thiophene which may bear nitro, chloro, bromo, cyano, methyl, methylmercapto, β-carbomethoxyethylmercapto, β-carboethoxyethylmercapto, carbomethoxy, carboethoxy or acetyl as a substituent are also particularly valuable.

The following are examples of particularly valuable diazo components:

4-nitroaniline, 2-chloro-4-nitroaniline, 2-bromo-4-nitroaniline, 2-cyano-4-nitroaniline, 2-methoxy-4-nitroaniline, 2-amino-5-nitrophenylsulfonic acid dimethylamide, butylamide or β-methoxyethylamide, 2-aminobenzonitrile, 3-chloro-4-aminobenzonitrile, 2-chloro-5-aminobenzonitrile, 2-amino-5-chlorobenzonitrile, 2,5-dichloro-4-aminobenzonitrile, 1-amino-2,4-dicyanobenzene, 1-amino-2,4-dicyano-6-chlorobenzene, 2-chloro-4-amino-5-nitrobenzonitrile, 2-amino-3-chloro-5-nitrobenzonitrile, 2-amino-3-bromo-5-nitrobenzonitrile, 2,6-dicyano-4-nitroaniline, 2,5-dichloro-4-nitroaniline, 2,6-dichloro-4-nitroaniline, 2,6-dibromo-4-nitroaniline, 2-chloro-6-bromo-4-nitroaniline, 2,4-dinitroaniline, 2,4-dinitro-6-chloroaniline, 2,4-dinitro-6-bromoaniline, 2-amino-3,5-dinitrobenzonitrile, 1-amino-4-nitrobenzene-2-methylsulfone, 1-amino-4-nitrobenzene-2-ethylsulfone, 4-methylsulfonylaniline, 1-amino-2-chlorobenzene-4-methylsulfone, 1-amino-2,6-dibromobenzene-4-methylsulfone, 1-amino-2,6-dichlorobenzene-4-methylsulfone, esters of 2-aminobenzoic acid, 4-aminobenzoic acid, 2-amino-5-nitrobenzoic acid, 2-amino-3-chloro-5-nitrobenzoic acid, 2-amino-3,5-dichlorobenzoic acid and 2-amino-3,5-dibromobenzoic acid, the methyl or β-methoxyethyl ester of 2-amino-3,5-dinitrobenzoic acid, diethyl 2-aminoterephthalate, 4-aminoazobenzene, 2,3'-dimethyl-4-aminoazobenzene, 2',3-dimethyl-4-aminoazobenzene, 2,5-dimethyl-4-aminoazobenzene and 3,5-dibromo-4-aminoazobenzene.

The following are examples of particularly valuable heterocyclic diazo components:

2-amino-5-nitrothiazole, 2-amino-4-methyl-5-nitrothiazole, 2-amino-4-methylthiazole-5-carboxylic acid ethyl ester, 2-amino-5-phenyl-2,3,4-thiadiazole, 3-phenyl-5-amino-1,2,4-thiadiazole, 3-methylmercapto-5-amino-1,2,4-thiadiazole, 3-β-carbomethoxyethylmercapto-5-amino-1,2,4-thiadiazole, 3-β-carboethoxyethylmercapto-5-amino-1,2,4-thiadiazole, 2-amino-6-cyanobenzothiazole, 2-amino-6-carboxylic acid methyl ester benzothiazole, 2-amino-6-nitrobenzothiazole, 2-amino-3-cyano-4-methylthiophene-5-carboxylic ester, 3-amino-5-nitro-2,1-benzoisothiazole, 3-amino-5-nitro-7-chloro-2,1-benzoisothiazole, 3-amino-5-nitro-7-bromo-2,1-benzoisothiazole, 4-amino-7-nitro-1,2-benzoisothiazole, 4-amino-5-bromo-1,2-benzoisothiazole, 4-amino-5-bromo-7-nitro-1,2-benzoisothiazole, 4-amino-5-cyano-7-nitro-1,2-benzoisothiazole and 4-amino-5-chloro-7-nitro-1,2-benzoisothiazole.

The new dyes are yellow to blue and are suitable for dyeing textile materials of acrylonitrile polymers, synthetic polyamides, cellulose esters such as secondary cellulose acetate or cellulose triacetate and particularly of synthetic linear polyesters such as polyethylene glycol terephthalate or polymers of similar chemical constitution. Strong colorations are obtained which are distinguished by outstanding fastness properties.

The following Examples illustrate the invention. Parts and percentages are by weight unless otherwise specified.

EXAMPLE 1

37 parts of 2,6-dichloro-3-cyano-4-methylpyridine is suspended in 50 parts by volume of methanol, then 30 parts of norbornylamine and 25 parts of triethylamine are added and the whole is stirred for 6 hours at 45° to 55° C. When the reaction is over the mixture is added while stirring to 500 parts by volume of water and 30 parts by volume of concentrated hydrochloric acid, and the mixture of products of the formulae (a) and (b):

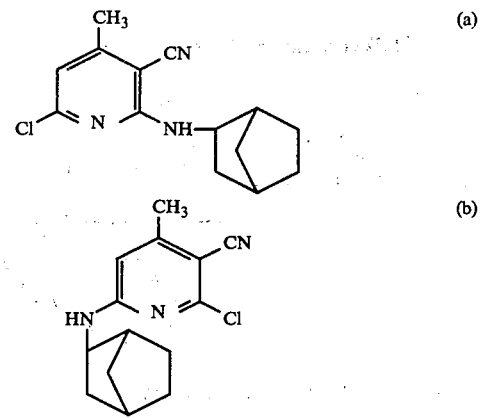

obtained in which the proportion of product (a) predominates is filtered off, washed with water and dried. A colorless powder is obtained which melts at from 110° to 112° C.

22.8 parts of this powder is stirred with 30 parts of the amine of the formula H₂N—CH₂—CH₂—O—CH₂—CH₂—OH and 30 parts by volume of N-methylpyrrolidone for five hours at 125° to 135° C. The mixture is then acidified with about 60 parts by volume of glacial acetic acid and it is added to a solution of diazotized p-nitroaniline which has been prepared as follows:

13.8 parts of p-nitroaniline is stirred into a mixture of 40 parts by volume of concentrated hydrochloric acid and 100 parts by volume of water for one hour. The mixture is then diluted by adding ice and water to a volume of 400 parts by volume and 33.5 parts by volume of a 23% solution of sodium nitrite is added at 0° to 5° C. The whole is stirred for 2 hours at 5° C, filtered and any excess of nitrous acid is destroyed in the usual manner.

The coupling mixture is carefully adjusted to pH 1 to 2 with aqueous caustic soda solution. When coupling is over the deposited dye mixture of the formula:

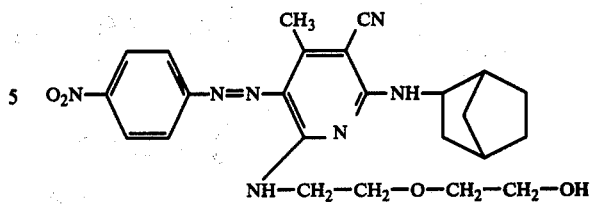

and

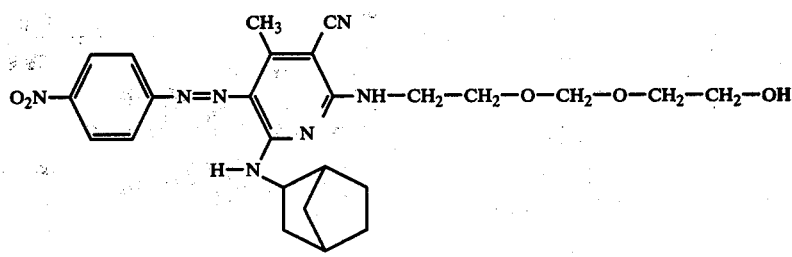

is suction filtered, washed with water and dried. About 46 parts of a reddish brown powder is obtained which dissolves in dimethylformamide with an orange color and dyes polyethylene glycol terephthalate full orange hues of very good fastness properties.

Methods analogous to those above described are used to obtain the dyes characterized in the following Tables by their diazo components and coupling components:

Table 1

Coupling component

| Ex. No. | Diazo component | R² | Hue |
|---|---|---|---|
| 2 | CN, NH₂ (ortho) | H | yellow |
| 3 | | —CH₂—CH₂—OH | |
| 4 | | —CH₂—CH₂—CH₂—OH | |
| 5 | | —CH₂—CH₂—O—CH₂—CH₂—OH | |
| 6 | Cl, CN, NH₂ | —H | yellow |
| 7 | | —CH₂—CH₂—OH | |
| 8 | | —CH₂—CH₂—CH₂—OH | |
| 9 | | —CH₂—CH₂—O—CH₂—CH₂—OH | |
| 10 | Br, CN, NH₂ | —H | yellow |
| 11 | | —CH₂—CH₂—OH | |
| 12 | | —CH₂—CH₂—CH₂—OH | |
| 13 | | —CH₂—CH₂—O—CH₂—CH₂—OH | |
| 14 | Br, CN, NH₂ (with extra Br) | H | orange |
| 15 | | —CH₂—CH₂—OH | |
| 16 | | —CH₂—CH₂—CH₂—OH | |
| 17 | | —CH₂—CH₂—O—CH₂—CH₂—OH | |
| 18 | COOCH₃, Cl, NH₂, Cl | —CH₂—CH₂—OH | orange |
| 19 | | —CH₂—CH₂—CH₂—OH | |
| 20 | | —CH₂—CH₂—O—CH₂—CH₂—OH | |

Table 1-continued

Coupling component (structure: pyridine ring with H₃C at 4-position, CN at 3-position, NHR² at 6-position, and 2-position NH-norbornyl)

| Ex. No. | Diazo component | R² | Hue |
|---|---|---|---|
| 21 | O₂N—C₆H₄—NH₂ (4-nitroaniline) | H | orange |
| 22 | | —CH₂—CH₂—OH | |
| 23 | | —CH₂—CH₂—CH₂—OH | |
| 24 | | —CH₂—CH₂—CH₂—OCOCH₃ | |
| 25 | | —(CH₂)₃—O—(CH₂)₂OH | |
|    | | —CH₂—CH₂—O—CH₂—CH₂—OH | |
| 26 | O₂N—C₆H₄—NH₂ | —CH₂—CH₂—O—CH₃ | orange |
| 27 | | —CH₂—CH₂—CH₂—O—CH₃ | |
| 28 | | —CH₂—CH₂OCHO | |
| 29 | | —(CH₂)₆—OH | |
| 30 | 2-Cl-4-NO₂-aniline | —H | yellowish red |
| 31 | | —CH₂—CH₂—OH | |
| 32 | | —CH₂—CH₂—CH₂—OH | |
| 33 | | —CH₂—CH₂—O—CH₂—CH₂—OH | |
| 34 | | —(CH₂)₃O(CH₂)₂OH | |
| 35 | | —CH₂—CH₂—CH₂—O—CH₃ | |
| 36 | | —CH₂—CH₂—CH₂—OCOCH₃ | |
| 37 | 2-OCH₃-4-NO₂-aniline | —CH₂—CH₂—OH | yellowish red |
| 38 | | —CH₂—CH₂—CH₂—OH | |
| 39 | | —CH₂—CH₂—O—CH₂—CH₂—OH | |
| 40 | 2-OCH₃-4-NO₂-aniline | —CH₂—CH₂—OH | yellowish red |
| 41 | | —CH₂—CH₂—CH₂—OH | |
| 42 | | —CH₂—CH₂—O—CH₂—CH₂—OH | |
| 43 | 2-NO₂-4-Cl-aniline | —CH₂—CH₂—OH | orange |
| 44 | | —CH₂—CH₂—CH₂—OH | |
| 45 | 4-cyanoaniline | —CH₂—CH₂—OH | yellow |
| 46 | | —CH₂—CH₂—CH₂—OH | |
| 47 | | —CH₂—CH₂—O—CH₂—CH₂—OH | |
| 48 | 2-CN-4-CN-aniline | —CH₂—CH₂—OH | orange |
| 49 | | —CH₂—CH₂—CH₂—OH | |
| 50 | | —CH₂—CH₂—O—CH₂—CH₂—OH | |
| 51 | 2-SO₃CH₃-4-Cl-aniline | H | yellow |
| 52 | | —CH₂—CH₂—OH | |
| 53 | | —CH₂—CH₂—CH₂—OH | |
| 54 | | —CH₂—CH₂—CH₂—O—CH₃ | |
| 55 | 2-CF₃-4-Cl-aniline | —CH₂—CH₂—OH | yellow |
| 56 | | —CH₂—CH₂—CH₂—OH | |
| 57 | | —CH₂—CH₂—O—CH₂—CH₂—OH | |
| 58 | N-(2-hydroxyethyl)-3-aminophthalimide | —H | yellow |
| 59 | | —CH₂—CH₂—OH | |
| 60 | | —CH₂—CH₂—CH₂—OH | |
| 61 | | —CH₂—CH₂—O—CH₂—CH₂—OH | |
| 62 | | —CH₂—CH₂—O—CH₃ | |

Table 1-continued

Coupling component

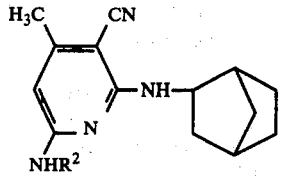

| Ex. No. | Diazo component | R² | Hue |
|---|---|---|---|
| 63 | 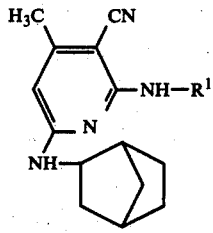 | —CH₂—CH₂—CH₂—OH | yellowish red |
| 64 | | —CH₂—CH₂—OH | |

Table 2

Coupling component:

$$\text{(coupling component structure with } H_3C, CN, NH-R^1, N, NH\text{-norbornyl)}$$

| Ex. No. | Diazo component | R¹ | Hue |
|---|---|---|---|
| 65 | 2-CN-aniline | —CH₂—CH₂—OH | yellow |
| 66 | 5-Cl-2-CN-aniline | —CH₂—CH₂—OH | yellow |
| 67 | | —CH₂—CH₂—CH₂—OH | |
| 68 | | —CH₂—CH₂—O—CH₂—CH₂—OH | |
| 69 | 4-O₂N-aniline | —CH₂—CH₂—OH | orange |
| 70 | | —CH₂—CH₂—CH₂—OH | |
| 71 | | —CH₂—CH₂—O—(CH₂)₂—OH | |
| 72 | 3,5-Br-2-CN-aniline | —CH₂—CH₂—CH₂—OH | orange |
| 73 | | —CH₂—CH₂—O—CH₂—CH₂—OH | |
| 74 | 2-Cl-4-O₂N-aniline | —CH₂—CH₂—OH | scarlet |
| 75 | | —CH₂—CH₂—CH₂—OH | |
| 76 | 2-CF₃-Cl-aniline | —CH₂—CH₂—CH₂—OH | yellow |
| 77 | | —CH₂—CH₂—O—(CH₂)₂OH | |
| 78 | N-(2-hydroxyethyl)phthalimide | —CH₂—CH₂—OH | yellow |
| 79 | | —CH₂—CH₂—CH₂—OH | |
| 80 | | —CH₂—CH₂—CH₂—CH₃ | |

EXAMPLE 81

While stirring at 15° to 25° C 19.5 parts of 3-amino-5-nitro-2,1-benzoisothiazole is added in portions to about 75 to 85 parts of 96% sulfuric acid and the mixture is then cooled to 0° to 4° C. 32.5 parts of 23% nitrosylsulfuric acid is then dripped in at this temperature. Diazotization is over after stirring for about three to 4 hours at 0° to 5° C. The diazonium salt mixture is then added to a solution or suspension, cooled to 0° C, of 30 parts of the coupling component of the formula:

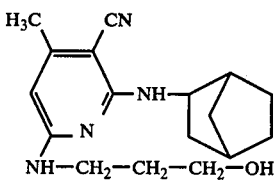

in 50 parts of 30% hydrochloric acid, 500 parts of water and 150 parts of glacial acetic acid. Ice and sodium acetate are added gradually during coupling so that the temperature of the coupling mixture does not exceed 5° C and the pH is finally about 2. The deposited dye of the formula:

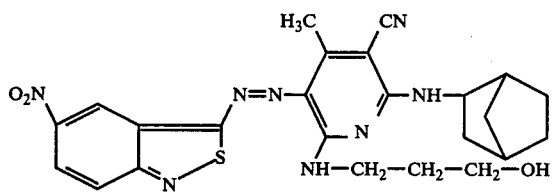

is filtered off, washed with hot water and dried. About 49 parts of a black powder is obtained which dissolves in dimethylformamide with a reddish blue color and dyes polyethylene glycol terephthalate cloth reddish blue hues having very good fastness properties.

EXAMPLE 82

180 parts by volume of glacial acetic acid, 15 parts by volume of concentrated hydrochloric acid and 10 parts of ice are added to 11 parts of 2-amino-5-nitrobenzoic acid methoxyethyl ester. The whole is cooled to 0° to 5° C and then 13.5 parts by volume of 23% sodium nitrite solution is added. After about 2 to 3 hours any excess of nitrous acid present is destroyed in the usual way, the diazonium salt solution is diluted with 1000 parts by volume of ice-water and then a solution of the coupling component of the formula:

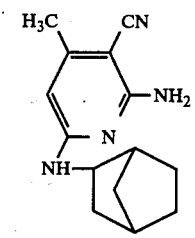

in 100 parts of glacial acetic acid and 10 parts of concentrated hydrochloric acid are added. The whole is stirred for half an hour and then 40% caustic soda solution is added until the pH of the coupling mixture is 2. After the coupling is over the deposited dye of the formula:

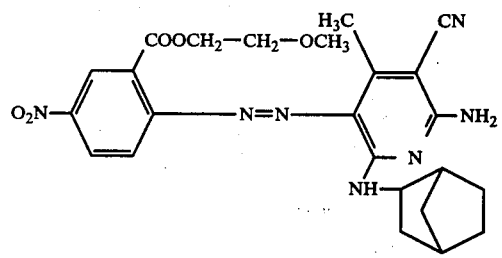

is suction filtered, washed with water and dried.

Table 3

Coupling component:

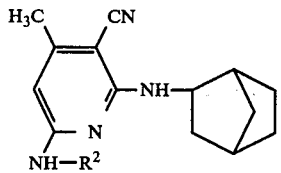

| Example No. | Diazo component | $R^2$ | Hue |
|---|---|---|---|
| 83 | | $-CH_2-CH_2-CH_2-OH$ | yellowish |
| 84 | | $-(CH_2)_3O(CH_2)_2OH$ | red |
| 85 | O$_2$N—⬡—CN, NH$_2$ | $-CH_2-CH_2-O-CH_2-CH_2-OH$ | |
| 86 | | $-(CH_2)_6-OH$ | |
| 87 | | $-CH_2-CH_2-OH$ | yellowish |
| 88 | O$_2$N—⬡—Br, NH$_2$ | $-CH_2-CH_2-CH_2-OH$ | red |
| 89 | | $-CH_2-CH_2-O-CH_2-CH_2-OH$ | |

Table 3-continued

Coupling component:

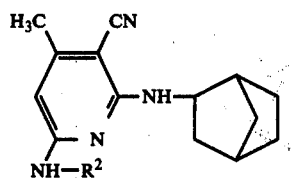

| Example No. | Diazo component | R² | Hue |
|---|---|---|---|
| 90 | (2-NH₂, 3-Br, 5-NO₂, 6-CN benzene) | —H | bluish red |
| 91 | | —CH₂—CH₂—OH | |
| 92 | | —CH₂—CH₂—CH₂—OH | |
| 93 | | —(CH₂)₃O(CH₂)₂OH | |
| 94 | | —CH₂—CH₂—O—CH₂—CH₂—OH | |
| 95 | (2-NH₂, 3-Cl, 5-NO₂, 6-CN benzene) | —CH₂—CH₂—OH | bluish red |
| 96 | | —CH₂—CH₂—CH₂—OH | |
| 97 | | —(CH₂)₃O(CH₂)₂OH | |
| 98 | | —CH₂—CH₂—O—CH₂.CH₂—OH | |
| 99 | (2-NH₂, 5-NO₂, 6-COOCH₃ benzene) | —CH₂—CH₂—OH | red |
| 100 | | —CH₂—CH₂—CH₂—Oh | |
| 101 | | —CH₂—CH₂—O—CH₂—CH₂—OH | |
| 102 | (2-NH₂, 3-Br, 5-NO₂, 6-COOCH₃ benzene) | —CH₂—CH₂—OH | red |
| 103 | | —CH₂—CH₂—CH₂—OH | |
| 104 | (2-NH₂, 3-COOCH₂—CH₂—OCH₃, 5-NO₂ benzene) | —CH₂—CH₂—OH | red |
| 105 | | —CH₂—CH₂—CH₂—OH | |
| 106 | (2-NH₂, 3-NO₂, 5-NO₂ benzene) | —CH₂—CH₂—OH | red |
| 107 | | —CH₂—CH₂—CH₂—OH | |
| 108 | | —CH₂—CH₂—O—CH₂—CH₂—OH | |
| 109 | (2-NH₂, 3-Cl, 5-NO₂, 6-Cl benzene) | —CH₂—CH₂—OH | brownish red |
| 110 | | —CH₂—CH₂—CH₂—OH | |
| 111 | | —CH₂—CH₂—O—CH₂—CH₂—OH | |
| 112 | (2-NH₂, 3-Br, 5-NO₂, 6-Br benzene) | —CH₂—CH₂—OH | brownish red |
| 113 | | —CH₂—CH₂—CH₂—OH | |
| 114 | | —CH₂—CH₂—O—CH₂—CH₂—OH | |

Table 3-continued

Coupling component:

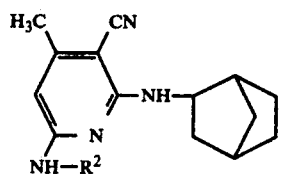

| Example No. | Diazo component | $R^2$ | Hue |
|---|---|---|---|
| 115 | 2-amino-4-nitro-6-bromo-1-chlorobenzene (Cl, NH2, Br, O2N on benzene) | —CH2—CH2—OH | brownish |
| 116 | | —CH2—CH2—CH2—OH | red |
| 117 | 2-amino-4-nitro-1,3-dicyanobenzene | —CH2—CH2—O—H | bluish |
| 118 | | —CH2—CH2—CH2—O—CH3 | red |
| 119 | 2-amino-4-nitro-1-methylsulfonylbenzene | —CH2—CH2—OH | red |
| 120 | | —CH2—CH2—CH2—OH | |
| 121 | (aminothiazole / nitrophenyl compound) | —CH2—CH2—OH | reddish |
| 122 | | —CH2—CH2—CH2—OH | blue |
| 123 | | —(CH2)3O(CH2)2OH | |
| 124 | | —CH2—CH2—O—CH2—CH2—OH | |
| 125 | | —(CH2)6—OH | |
| 126 | | —(CH2)3—O—(CH2)4—OH | |
| 127 | (bromo/chloro aminothiazole nitrophenyl) | —CH2—CH2—O—CH2—CH2—OH | blue |
| 128 | 1-methylanthraquinone | —CH2—CH2—O—CH2—CH2—OH | yellowish brown |
| 129 | 2-amino-phenylsulfonylbenzene | —CH2—CH2—CH2—OH | yellow |
| 130 | | —CH2—CH2—O—CH2—CH2—OH | |
| 131 | 4-amino-diphenylsulfone | —CH2—CH2—O—CH2—CH2—OH | yellow |
| 132 | | —(CH2)3—O—H | |
| 133 | 2-amino-4-nitro-6-chloro-1-nitrobenzene | —CH2—CH2—OH | bluish |
| 134 | | —CH2—CH2—CH2—OH | red |
| 135 | | —CH2—CH2—O—CH2—CH2—OH | |

Table 3-continued

Coupling component:

H$_3$C, CN substituted pyridine with NH-norbornyl and NH-R$^2$ groups

| Example No. | Diazo component | R$^2$ | Hue |
|---|---|---|---|
| 136 | 2-amino-3-bromo-4,6-dinitro (NO$_2$, O$_2$N, NH$_2$, Br) | —(CH$_2$)$_3$—OH | bluish red |
| 137 | | —CH$_2$—CH$_2$—O—CH$_2$—CH$_2$—OH | |
| 138 | 4-amino-7-nitrobenzisothiazole (O$_2$N, NH$_2$, S, N) | —CH$_2$—CH$_2$—OH | bluish red |
| 139 | | —CH$_2$—CH$_2$—O—CH$_2$—CH$_2$—OH | |
| 140 | | —(CH$_2$)$_3$—O—(CH$_2$)$_4$—OH | |
| 141 | 4-amino-5-chloro-7-nitrobenzisothiazole (Cl, O$_2$N, NH$_2$, S, N) | —CH$_2$—CH$_2$—O—CH$_2$—CH$_2$—OH | violet |
| 142 | 4-amino-5-cyano-7-nitrobenzisothiazole (CN, O$_2$N, NH$_2$, S, N) | —CH$_2$—CH$_2$—CH$_2$—OH | violet |
| 143 | 2-amino-5-nitro-ethylsulfonyl benzene (SO$_2$C$_2$H$_5$, O$_2$N, NH$_2$) | —CH$_2$—CH$_2$—CH$_2$—OH | bluish red |
| 144 | 2-amino-5-methylthio-1,3,4-thiadiazole (CH$_3$—S, N, N, S, NH$_2$) | —CH$_2$—CH$_2$—OH | orange |
| 145 | | —CH$_2$—CH$_2$—CH$_2$—OH | |
| 146 | | —CH$_2$—CH$_2$—O—CH$_2$—CH$_2$—OH | |
| 147 | CH$_3$O—C(O)—C$_2$H$_4$—S-thiadiazole-NH$_2$ | —CH$_2$—CH$_3$ | |
| 148 | | —CH$_2$—CH$_2$—CH$_2$—OH | |
| 149 | | —CH$_2$—CH$_2$(CH$_3$) | |
| 150 | | —CH$_2$—CH$_2$—O—CH$_2$—CH$_2$—OH | |
| 151 | 2-amino-5-nitrothiazole (O$_2$N, S, N, NH$_2$) | —CH$_2$—CH$_2$—OH | reddish violet |
| 152 | | —CH$_2$—CH$_2$—CH$_2$—OH | |
| 153 | | —CH$_2$—CH$_2$—O—CH$_2$—CH$_2$—OH | |

Table 3-continued

Coupling component:

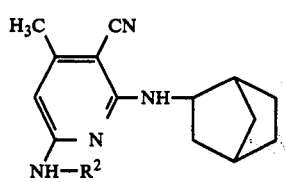

| Example No. | Diazo component | R² | Hue |
|---|---|---|---|
| 154 | CH₃ CN / CH₃—O—C(=O)—[thiophene S]—NH₂ | —CH₂—CH₂—OH | bluish |
| 155 | | —CH₂—CH₂—CH₂—OH | red |
| 156 | | —CH₂—CH₂—O—CH₂—CH₂—OH | |
| 157 | CH₃ CN / C₂H₅—O—C(=O)—[thiophene S]—NH₂ | —CH₂—CH₂—OH | bluish |
| 158 | | —CH₂—CH₂—CH₂—OH | red |
| 159 | | —CH₂—CH₂—O—CH₂—CH₂—OH | |
| 160 | O₂N—[benzene with NO₂, NH₂, CN]— | —CH₂—CH₂—OH | bluish |
| 161 | | —CH₂—CH₂—CH₂—OH | red |
| 162 | CH₃ CN / O₂N—[thiophene S]—NH₂ | —CH₂—CH₂—OH | violet |
| 163 | | —CH₂—CH₂—CH₂—OH | |

Table 4

Coupling component:

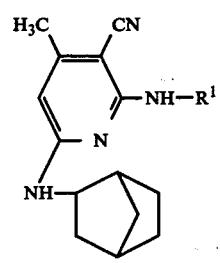

| Example No. | Diazo component | R¹ | Hue |
|---|---|---|---|
| 164 | Br / O₂N—[benzene]—NH₂ | —CH₂—CH₂—OH | yellowish |
| 165 | | —CH₂—CH₂—CH₂—OH | red |
| 166 | | —CH₂—CH₂—O—CH₂—CH₂—OH | |
| 167 | CN / O₂N—[benzene]—NH₂ | —CH₂—CH₂—OH | yellowish |
| 168 | | —CH₂—CH₂—CH₂—OH | red |
| 169 | | —CH₂—CH₂—O—CH₂—CH₂—OH | |
| 170 | | —CH₂—CH₂—O—CH₂—CH₂—OCHO | |
| 171 | | —(CH₂)₆OH | |

Table 4-continued

Coupling component:

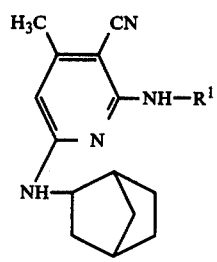

| Example No. | Diazo component | R¹ | Hue |
|---|---|---|---|
| 172 | 2-amino-5-nitro, 2-SO₂CH₃ (O₂N—C₆H₃(SO₂CH₃)—NH₂) | —CH₂—CH₂—CH₂—OH | red |
| 173 |  | —CH₂—CH₂—OH | red |
| 174 | 2-amino-5-nitro-3-bromo-benzonitrile | —CH₂—CH₂—OH | bluish |
| 175 |  | —CH₂—CH₂—CH₂—OH | red |
| 176 |  | —CH₂—CH₂—O—CH₂—CH₂—OH |  |
| 177 | 2-amino-5-nitro-3-chloro-benzonitrile | —CH₂—CH₂—OH | red |
| 178 |  | —CH₂—CH₂—CH₂—OH | bluish |
| 179 |  | —CH₂—CH₂—O—CH₂—CH₂—OH | red |
| 180 |  | —(CH₂)₃—O—(CH₂)₄—OH |  |
| 181 | 2-amino-3,5-dinitro, SO₂CH₃ | —CH₂—CH₂—CH₂—OH | violet |
| 182 | 4-amino-7-nitro-benzothiazole | —CH₂—CH₂—CH₂—OH | bluish |
| 183 |  | —CH₂—CH₂—O—CH₂—OH | red |
| 184 | 3,6-diamino-benzisothiazole | —CH₂—CH₂—CH₂—OH | Reddish |
| 185 |  | —CH₂—O—CH₂—CH₂—OH | blue |
| 186 | 3-amino-5-nitro-7-chloro-benzisothiazole | —CH₂—CH₂—O—CH₂—CH₂—OH | blue |
| 187 | 2-amino-3,5-dinitro | —CH₂—CH₂—OH | red |
| 188 |  | —CH₂—CH₂—CH₂—OH |  |
| 189 |  | —CH₂—CH₂—O—CH₂—CH₂—OH |  |

Table 4-continued

Coupling component:

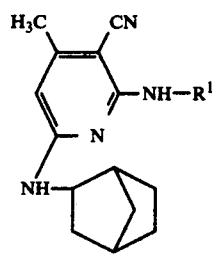

| Example No. | Diazo component | $R^1$ | Hue |
|---|---|---|---|
| 190 | | $-CH_2-CH_2-CH_2-OH$ | bluish |
| 191 | (2-amino-4-nitro-chloro-nitrobenzene) | $-CH_2-CH_2-O-CH_2-CH_2-OH$ | red |
| 192 | | $-CH_2-CH_2-CH_2-OH$ | red |
| 193 | (2-amino-5-nitro-benzoate) | $-CH_2-CH_2-O-CH_2-CH_2-OH$ | |

Table 5

Dye:

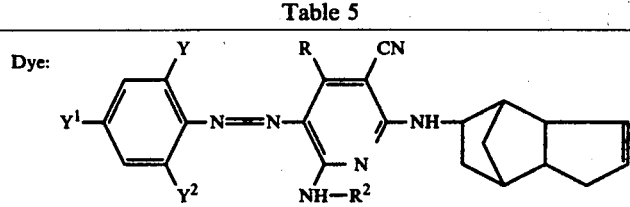

| Example No. | Y | $Y^1$ | $Y^2$ | R | $R^2$ | Hue |
|---|---|---|---|---|---|---|
| 194 | —H | —NO$_2$ | —H | —H | —CH$_2$—CH$_2$—OH | red |
| 195 | —Cl | —NO$_2$ | —H | —H | —CH$_2$—CH$_2$—OH | red |
| 196 | —CN | —NO$_2$ | —H | —H | —CH$_2$—CH$_2$—OH | red |
| 197 | —CH$_3$ | —NO$_2$ | —H | —H | —CH$_2$—CH$_2$—OH | orange |
| 198 | —Br | —NO$_2$ | —H | —H | —CH$_2$—CH$_2$—OH | yellowish red |
| 199 | —CN | —NO$_2$ | —H | —H | —CH$_2$—CH$_2$—CH$_2$—OH | bluish red |
| 200 | —CN | —NO$_2$ | —Cl | —H | —CH$_2$—CH$_2$—CH$_2$—OH | bluish red |
| 201 | —CN | —NO$_2$ | —Cl | —H | —CH$_2$—CH$_2$—OH | bluish red |
| 202 | —NO$_2$ | —NO$_2$ | —H | —H | —CH$_2$—CH$_2$—OH | bluish red |
| 203 | —SO$_2$CH$_3$ | —NO$_2$ | —H | —H | —CH$_2$—CH$_2$—OH | red |
| 204 | —SO$_2$CH$_3$ | —NO$_2$ | —H | —CH$_3$ | —CH$_2$—CH$_2$—OH | violet |
| 205 | —SO$_2$CH$_3$ | —NO$_2$ | —H | —C$_3$H$_7$(n) | —CH$_2$—CH$_2$—OH | red |
| 206 | —CN | —NO$_2$ | —H | —CH$_3$ | —CH$_2$—CH$_2$—OH | red |
| 207 | —CN | —Cl | —H | —CH$_3$ | —CH$_2$—CH$_2$—OH | yellow |
| 208 | —CN | —H | —H | —CH$_3$ | —CH$_2$—CH$_2$—OH | yellow |

Table 6

Coupling component:

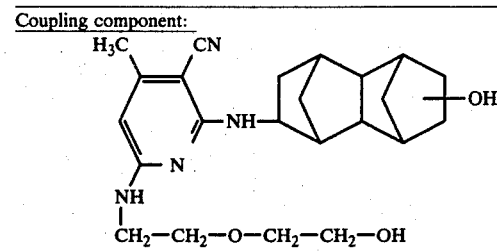

| Example No. | Diazo component | Hue |
|---|---|---|
| 209 | O₂N—C₆H₄—NH₂ (para) | orange |
| 210 | 2-Cl, 4-O₂N aniline | yellowish red |
| 211 | 2-CN, 4-O₂N aniline | yellowish red |
| 212 | 2-CN aniline | yellow |

Table 6-continued

Coupling component:

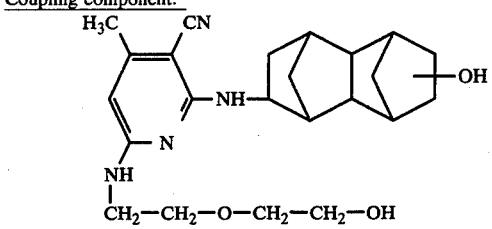

| Example No. | Diazo component | Hue |
|---|---|---|
| 213 | 2-NH₂, 3-NO₂, 5-O₂N benzene | bluish red |
| 214 | 2-NH₂, 3-CN, 5-Cl benzene | yellow |
| 215 | 2-NH₂, 3-SO₂CH₃, 5-O₂N benzene | red |
| 216 | 2-NH₂, 3-CN, 5-O₂N, 6-Cl benzene | red |

Table 7

Coupling component:

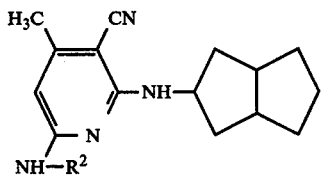

| Example No. | Diazo component | R² | Hue |
|---|---|---|---|
| 217 | 2-NH₂, 3-CN, 5-O₂N benzene | —CH₂—CH₂—OH | red |
| 218 | | —CH₂—CH₂—CH₂—OH | red |
| 219 | | —(CH₂)₃O(CH₂)₂OH | yellowish red |
| 220 | | —CH₂—CH₂—O—CH₂—CH₂—OH | yellowish red |
| 221 | 2-NH₂, 3-Cl, 5-O₂N benzene | —CH₂—CH₂—OH | yellowish red |
| 222 | | —CH₂—CH₂—CH₂—OH | yellowish red |
| 223 | | —CH₂—CH₂—O—CH₂—CH₂—OH | yellowish red |
| 224 | 4-O₂N aniline | —CH₂—CH₂—OH | orange |
| 225 | | —CH₂—CH₂—CH₂—OH | |
| 226 | | —CH₂—CH₂—O—CH₂—CH₂—OH | |

Table 7-continued

Coupling component:

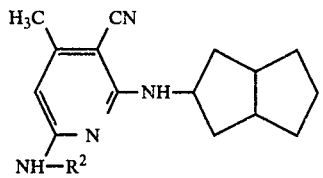

| Example No. | Diazo component | $R^2$ | Hue |
|---|---|---|---|
| 227 | (CN, $O_2N$, $NH_2$, Cl substituted benzene) | —(CH$_2$)$_3$—O—(CH$_2$)$_2$—OH | bluish red |
| 228 | | —CH$_2$—CH$_2$—OH | |
| 229 | | —CH$_2$—CH$_2$—CH$_2$—OH | |
| 230 | (NO$_2$, $O_2N$, $NH_2$ substituted benzene) | —(CH$_2$)$_3$—O—(CH$_2$)$_2$ OH | red |
| 231 | | —CH$_2$—CH$_2$—OH | |
| 232 | (CN, $NH_2$ substituted benzene) | —(CH$_2$)$_2$—O—(CH$_2$)$_2$OH | yellow |
| 233 | | —CH$_2$—CH$_2$—OH | |

Table 8

Dye:

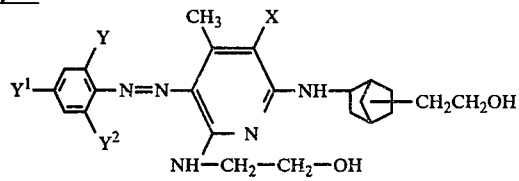

| Example No. | Y | $Y^1$ | $Y^2$ | X | Hue |
|---|---|---|---|---|---|
| 234 | —CN | —NO$_2$ | —H | —CN | red |
| 235 | —CN | —NO$_2$ | —Cl | —CN | bluish red |
| 236 | —H | —NO$_2$ | —H | —CN | orange |
| 237 | —Cl | —Cl | —CN | —CN | orange |
| 238 | —CN | —Br | —H | —CN | yellow |
| 239 | —CH$_3$ | —NO$_2$ | —H | —CN | orange |
| 240 | —OCH$_3$ | —NO$_2$ | —H | —CN | yellowish red |
| 241 | —SO$_2$CH$_3$ | —NO$_2$ | —H | —CN | bluish red |
| 242 | —CF$_3$ | —H | —H | —CN | yellow |
| 243 | —CF$_3$ | —Cl | —H | —CN | yellow |
| 244 | —CN | —CN | —H | —CN | orange |
| 245 | —CN | —NO$_2$ | —Br | —CN | bluish red |
| 246 | —Cl | —NO$_2$ | —H | —CN | yellowish red |
| 248 | —H | —NO$_2$ | —H | —CONH$_2$ | yellowish red |

When instead of the coupling components given above use is made of the corresponding compound containing OH instead of Cl dyes are obtained in the same hues but as a rule with better thermal fastnesses.

EXAMPLE 249

47 parts of 2,6-dichloro-3-cyano-4-methylpyridine in 50 parts by volume of methanol is treated at 55° C for 6 hours with a mixture of 44 parts of the amine of the formula:

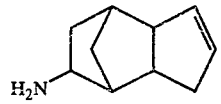

and 30 parts of triethylamine. After the reaction mixture has been processed as described in Example 1 there is obtained 63 parts of a colorless powder which melts at 90° to 92° C. 28.8 parts of this powder is stirred with 50 parts by volume of the amine of the formula H$_2$N—CH$_2$—CH$_2$—O—CH$_2$—CH$_2$—OH for 5 hours at 120° C. The whole is then cooled and acidified with glacial acetic acid. The coupling mixture is added to a solution, cooled to 0° C, of 13.8 parts of diazotized p-nitroanilin as in Example 1. After stirring for ten minutes some caustic soda solution is added so that the pH of the coupling mixture is from about 1 to 2. The mixture of dyes of the formulae:

and

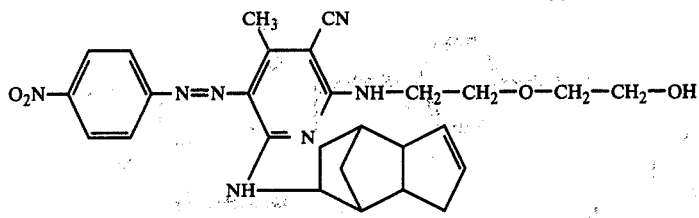

is filtered off, washed with water and dried. It dissolves in dimethylformamide to give an orange color and dyes polyethylene glycol terephthalate cloth orange hues having very good fastness properties.

We claim:
1. A dye of the formula

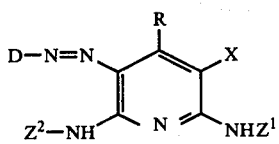

where D is phenyl substituted by chlorine, bromine, trifluoromethyl, methyl, methoxy, nitro, cyano, methylsulfonyl, ethylsulfonyl, phenylsulfonyl, carbalkoxy of a total 2 to 5 carbon atoms, carbo-β-alkoxyethoxy, said alkoxy having 1 to 4 carbon atoms, or N,N-dialkyl-substituted sulfamoyl, said alkyl having 1 to 3 carbon atoms; phenylazophenyl; phenylazophenyl substituted by chlorine, bromine or nitro; benzthiazolyl; benzthiazolyl substituted by nitro, cyano, methylsulfonyl or ethylsulfonyl; benzisothiazolyl substituted by chlorine, bromine, cyano or nitro; thiazolyl substituted by cyano or nitro; thienyl substituted by methyl, cyano, nitro or carbalkoxy of a total of 2 to 5 carbon atoms; or thiadiazolyl substituted by phenyl, methyl, chlorine, bromine, methylmercapto, ethylmercapto or alkoxycarbonylethylmercapto, said alkoxy having 1 to 4 carbon atoms;

R is alkyl of 1 to 3 carbon atoms;

X is carbamoyl or cyano; one of the radicals $Z^1$ and $Z^2$ is

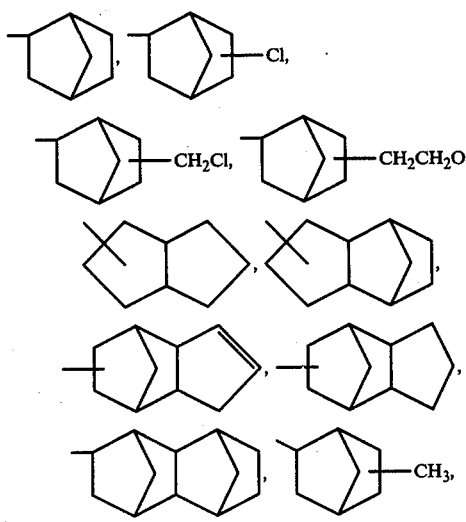

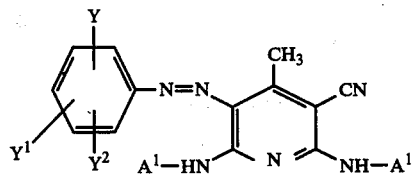

and the other is hydrogen; alkyl of one to six carbon atoms, alkyl of two to six carbon atoms substituted by hydroxy, OCHO, OCOCH₃, cyano, methoxy, ethoxy, phenoxy, phenoxy, phenoxyethoxy, benzyloxy or phenyl; cyclohexyl; phenyl; β-hydroxy-β-phenylethyl, or $(CH_2)_3(OC_2H_4)_nOT$; and T is alkyl of one to four carbon atoms, phenyl or benzyl; and n is 1 or 2.

2. A dye according to claim 1 of the formula:

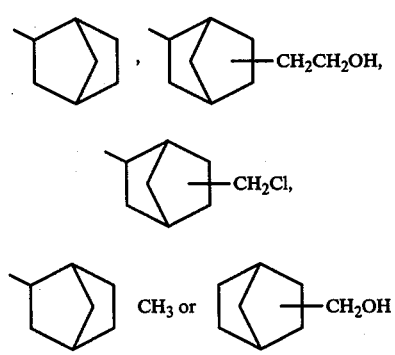

in which
Y is nitro, cyano, chloro, bromo, carbomethoxy, carboethoxy, β-methoxycarboethoxy, methylsulfonyl, ethylsulfony, methyl, methoxy or phenylazo;

$Y^1$ is hydrogen, nitro, chloro, bromo, cyano, methyl, methoxy, carbomethoxy, carboethoxy, methylsulfonyl or ethylsulfonyl;

$Y^2$ is hydrogen, chloro, bromo, cyano, methyl, methoxy, carbomethoxy or carboethoxy, one $A^1$ has the formula:

and the other $A^1$ is hydrogen or one of the alkyl radicals according to claim 1 substituted by hydroxy, alkoxy, OCHO or OCOCH₃.

3. The dye having the formula
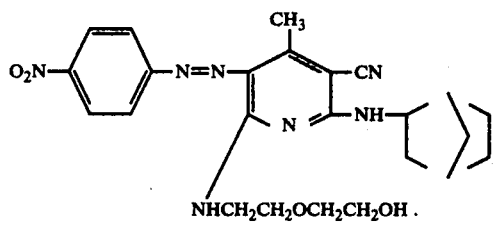
4. The dye having the formula
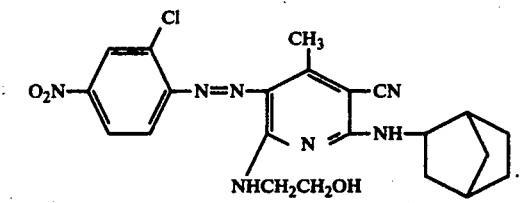
5. The dye having the formula
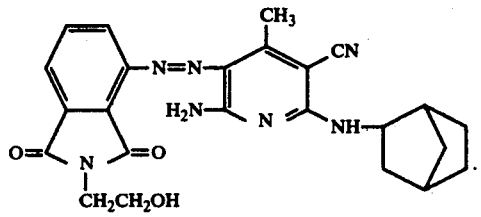
6. The dye having the formula
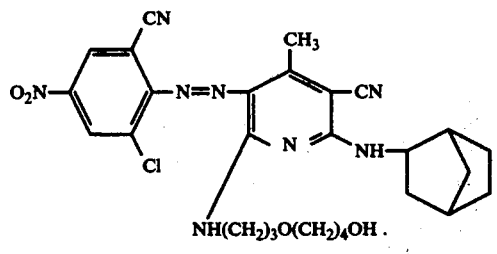
7. The dye having the formula
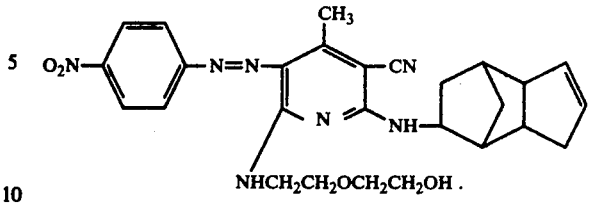
8. The dye having the formula
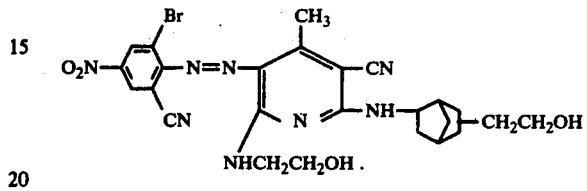
9. The dye having the formula
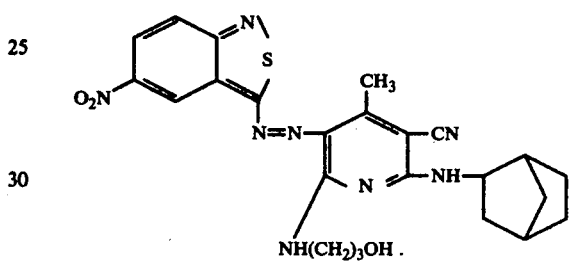
10. The dye having the formula
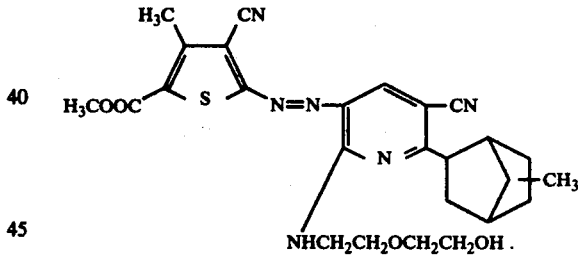
* * * * *

UNITED STATES PATENT AND TRADEMARK OFFICE
CERTIFICATE OF CORRECTION

PATENT NO. : 4,128,545
DATED : December 5, 1978
INVENTOR(S) : DEHNERT ET AL

It is certified that error appears in the above-identified patent and that said Letters Patent are hereby corrected as shown below:

In claim 3, delete " NH " and substitute

-- NH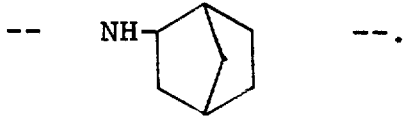 --.

[SEAL]

Signed and Sealed this

Fifteenth Day of May 1979

Attest:

RUTH C. MASON
Attesting Officer

DONALD W. BANNER
Commissioner of Patents and Trademarks